Jan. 13, 1942.  W. M. FULTON  2,269,812
AUTOMATIC STOKER
Filed Oct. 9, 1939   13 Sheets-Sheet 1

Inventor
Weston M. Fulton.

By Cameron, Kerkam & Sutton
Attorneys

Jan. 13, 1942.  W. M. FULTON  2,269,812
AUTOMATIC STOKER
Filed Oct. 9, 1939   13 Sheets-Sheet 2
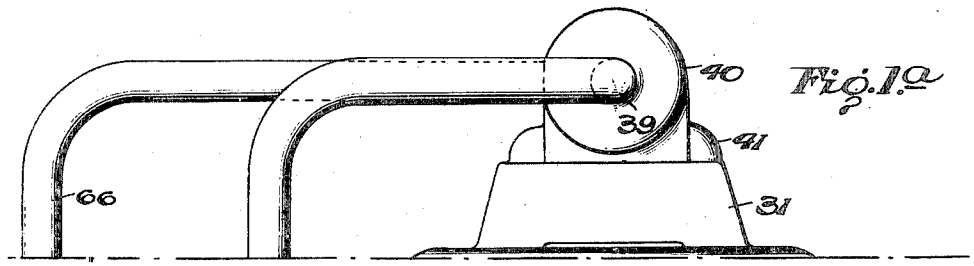
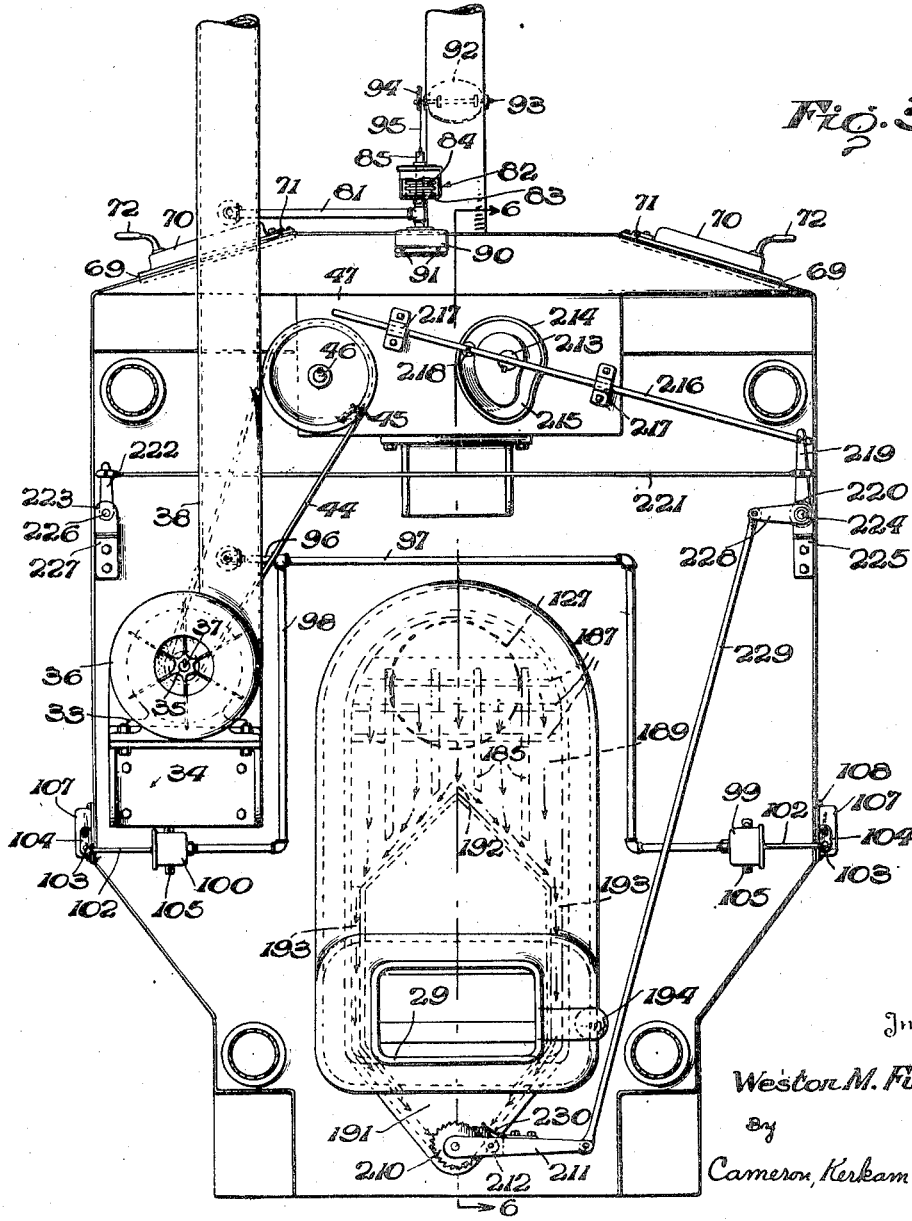
Inventor
Weston M. Fulton.
By
Cameron, Kerkam + Sutton
Attorneys

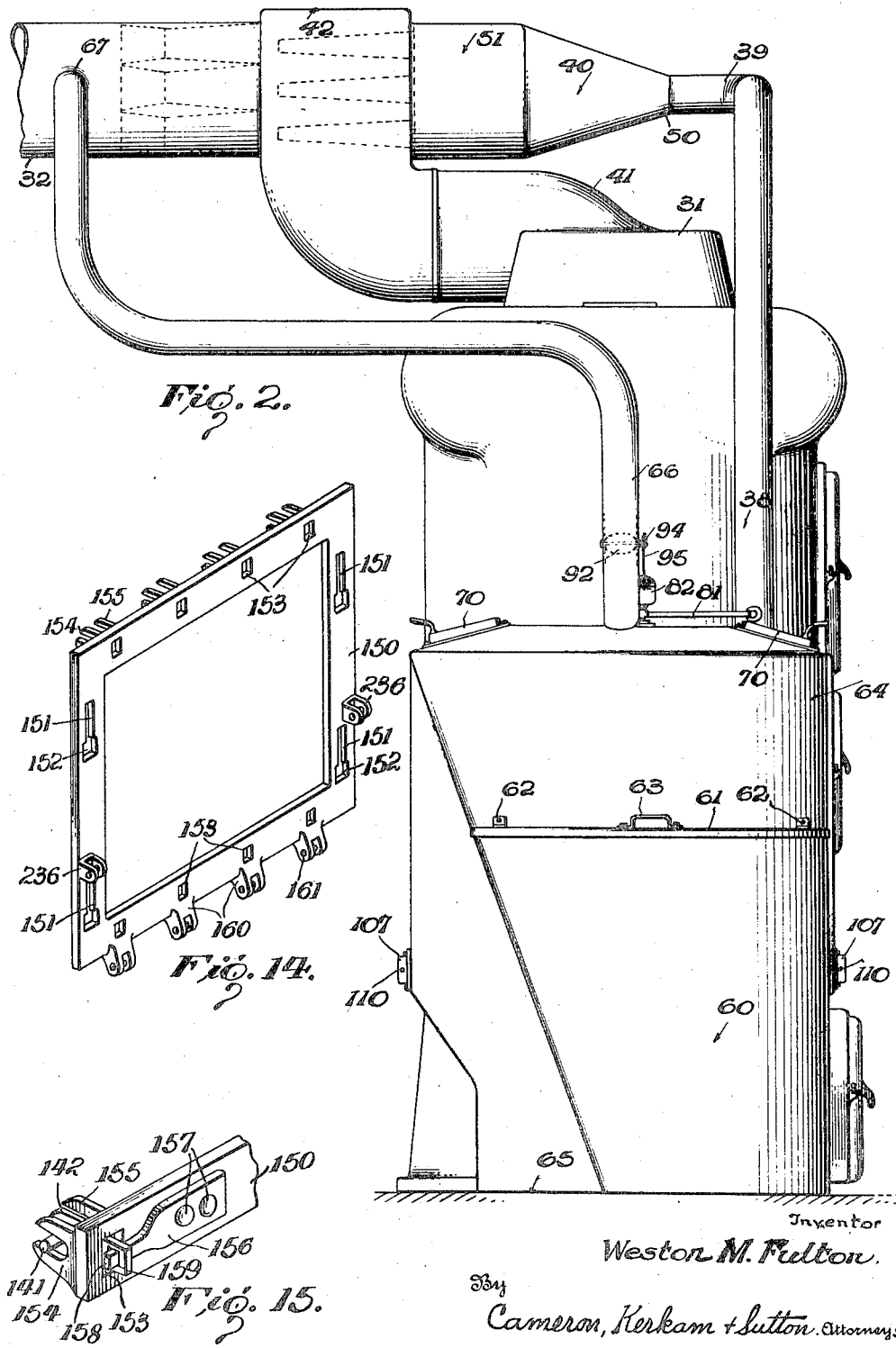

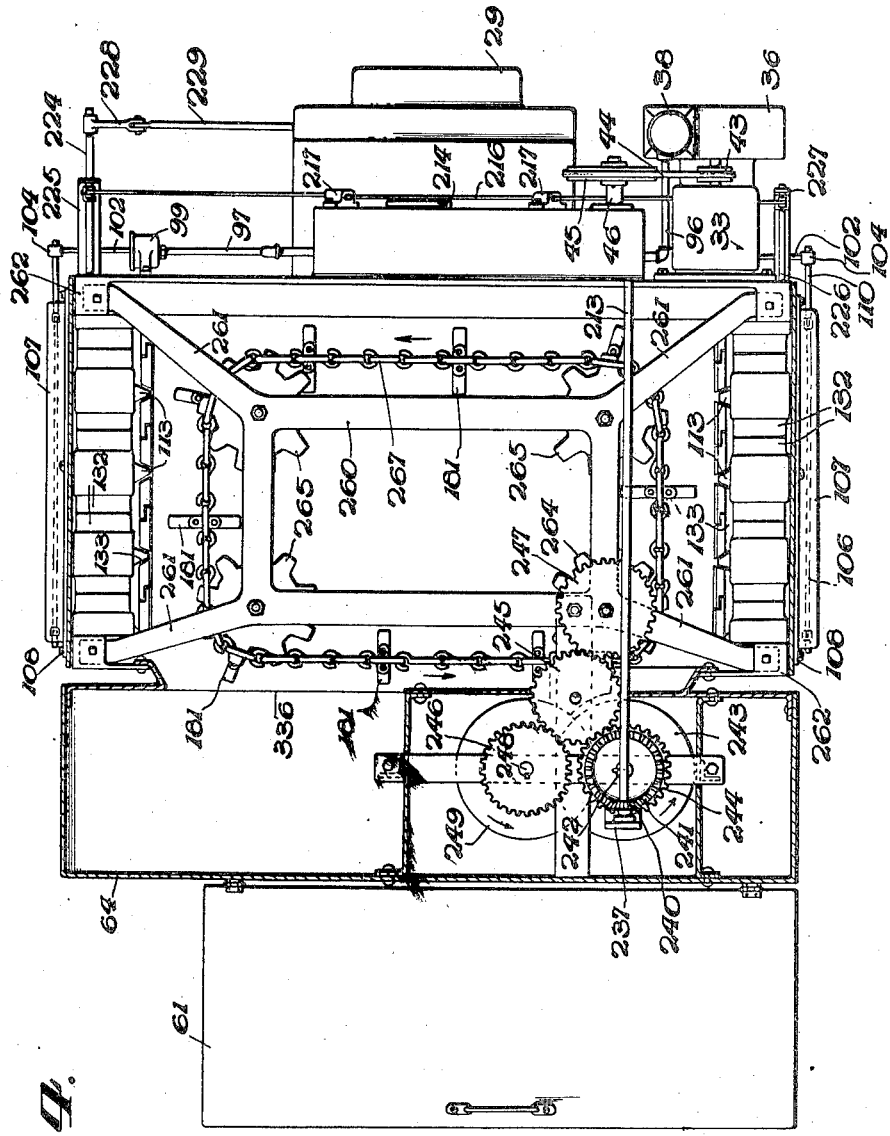

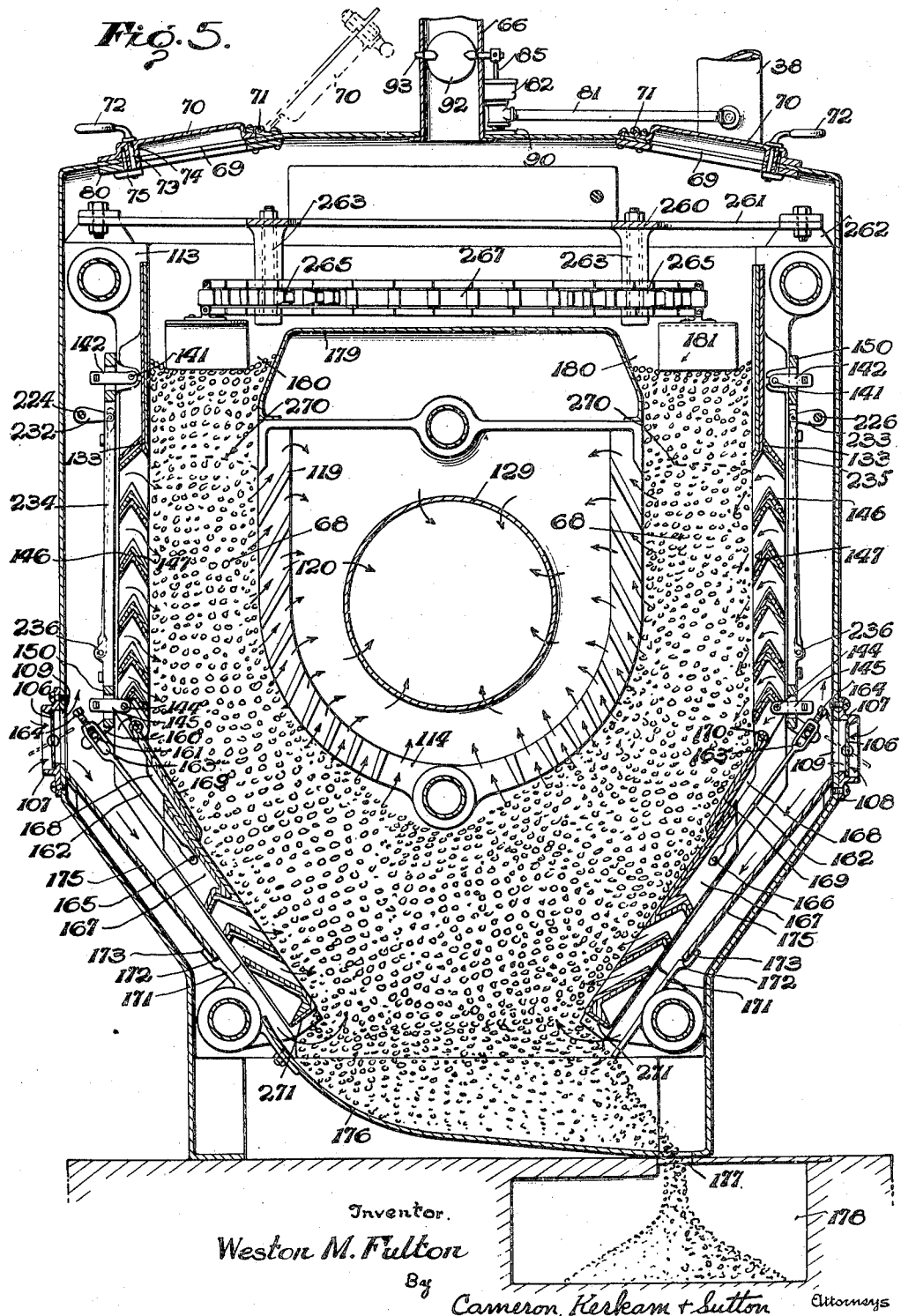

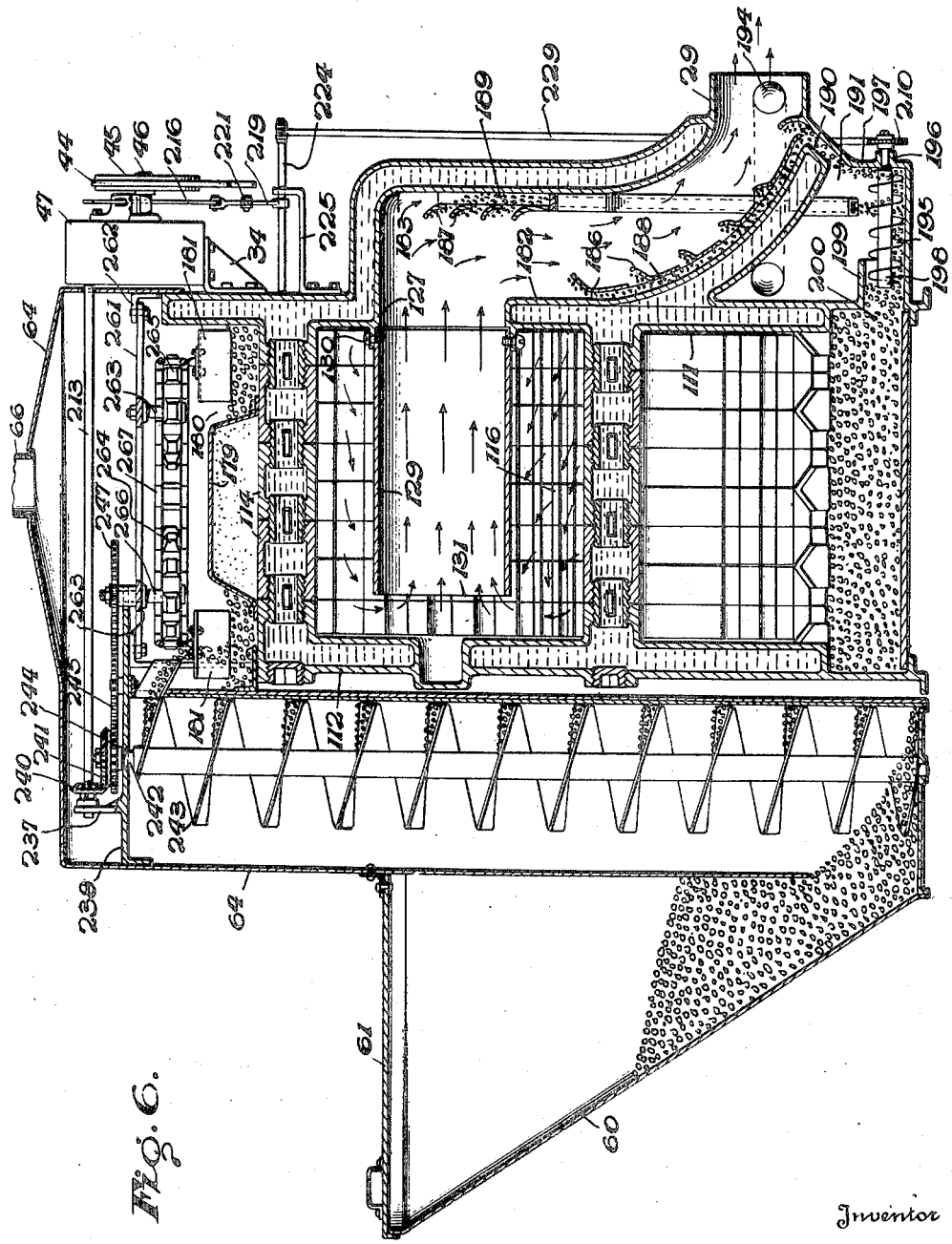

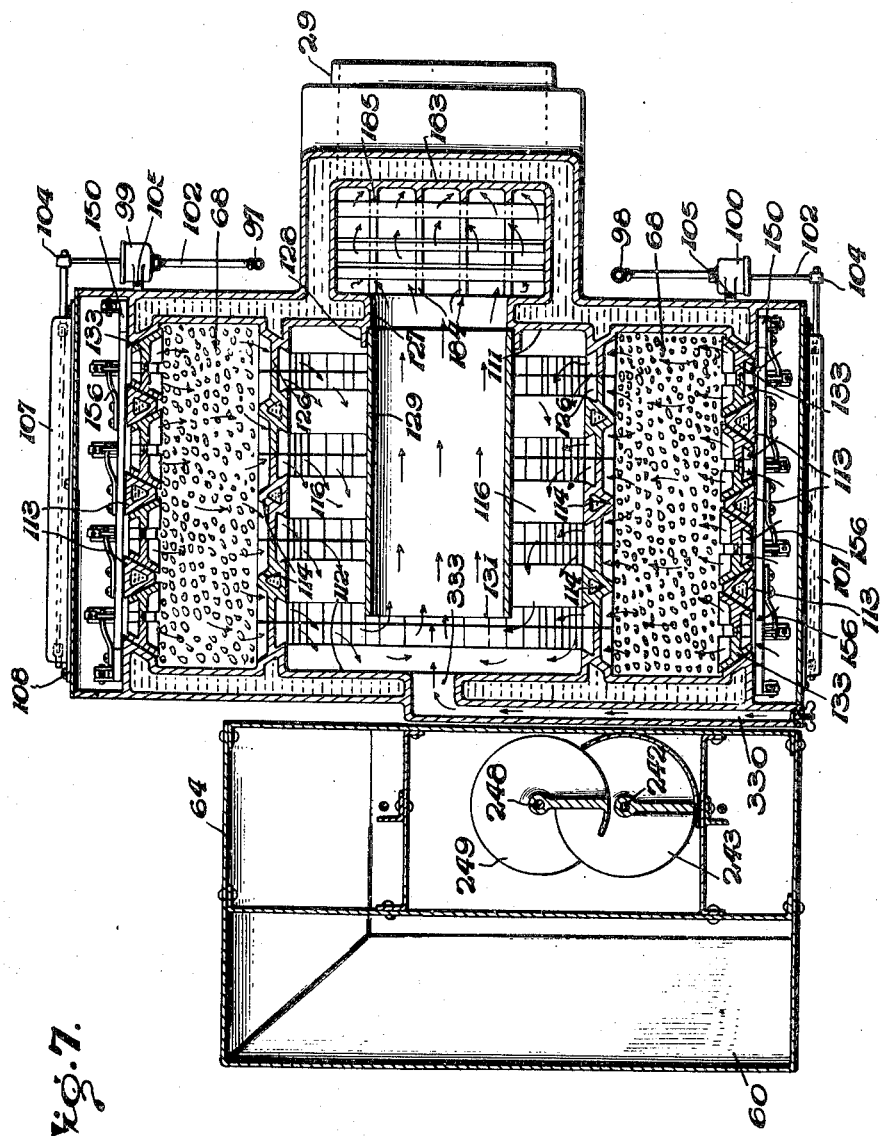

Jan. 13, 1942.  W. M. FULTON  2,269,812
AUTOMATIC STOKER
Filed Oct. 9, 1939  13 Sheets-Sheet 8
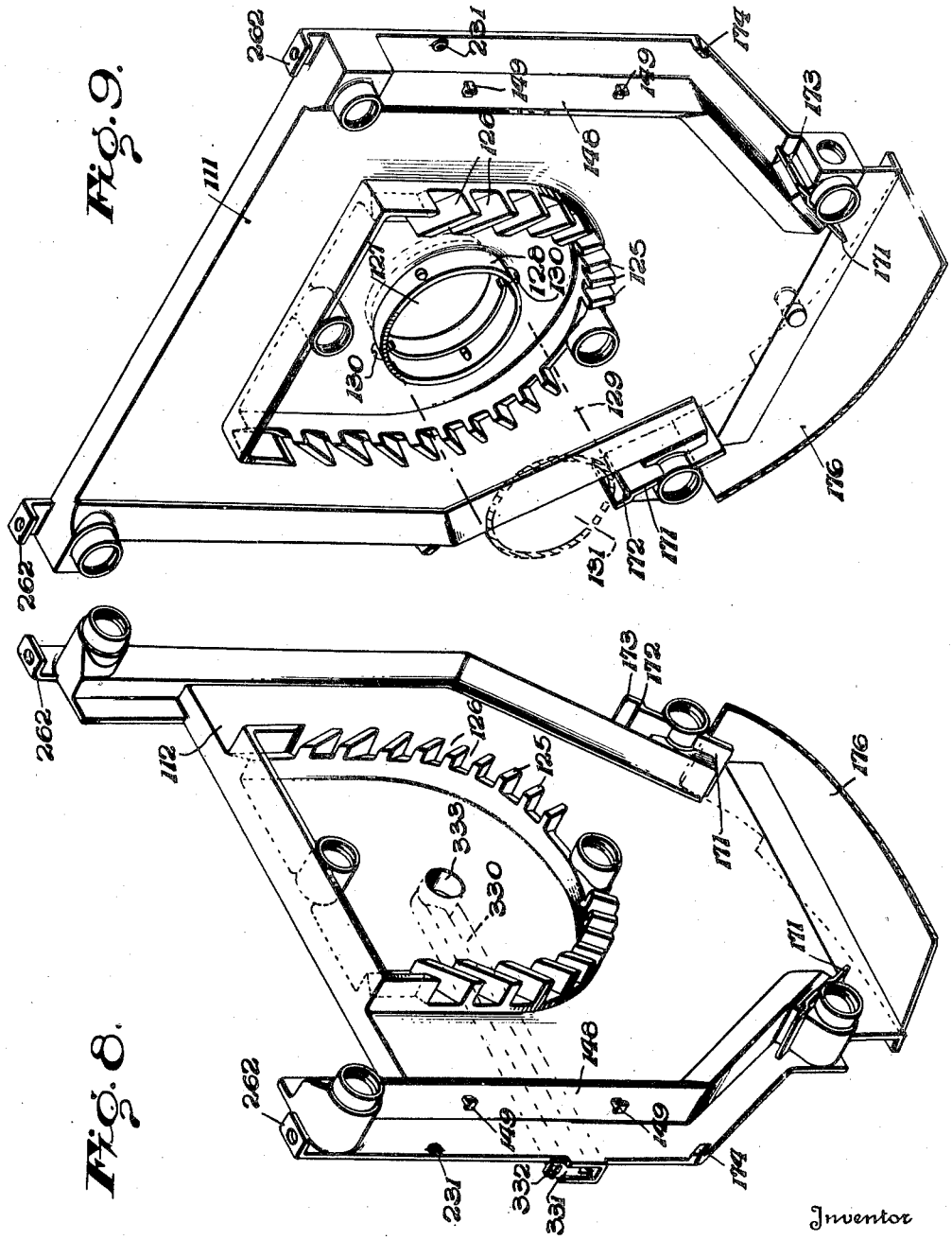
Inventor
Weston M. Fulton.
By Cameron, Kerkam & Sutton
Attorneys Jan. 13, 1942.  W. M. FULTON  2,269,812
AUTOMATIC STOKER
Filed Oct. 9, 1939  13 Sheets-Sheet 9
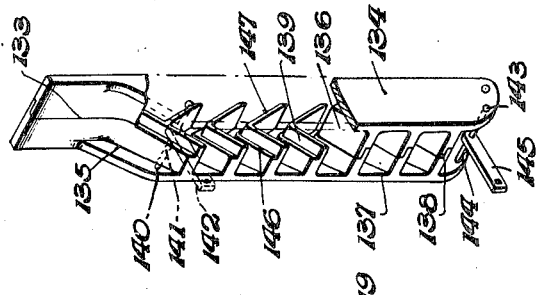
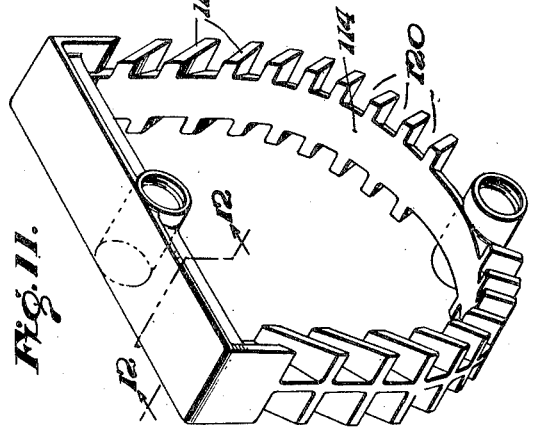
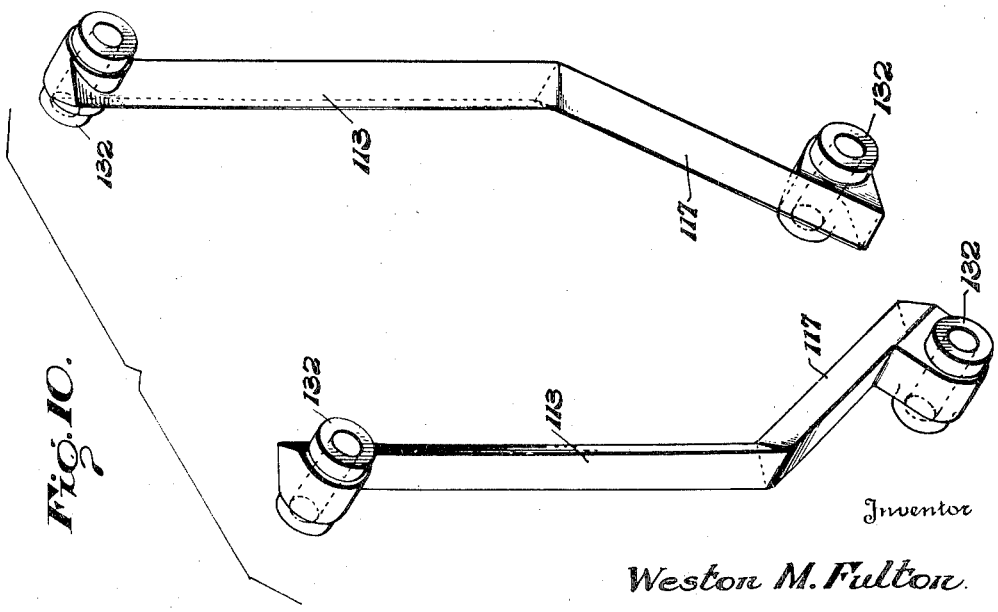
Inventor
Weston M. Fulton.
By Cameron, Kerkam + Sutton
Attorneys Jan. 13, 1942.   W. M. FULTON   2,269,812
AUTOMATIC STOKER
Filed Oct. 9, 1939   13 Sheets-Sheet 10

Inventor
Weston M. Fulton
By Cameron, Kerkam & Sutton
Attorneys

Jan. 13, 1942.  W. M. FULTON  2,269,812
AUTOMATIC STOKER
Filed Oct. 9, 1939  13 Sheets-Sheet 11

Inventor
Weston M. Fulton.
By Cameron, Kerkam + Sutton
Attorneys

Jan. 13, 1942.  W. M. FULTON  2,269,812
AUTOMATIC STOKER
Filed Oct. 9, 1939  13 Sheets-Sheet 12

Inventor
Weston M. Fulton.
By Cameron, Kerkam + Sutton
Attorneys

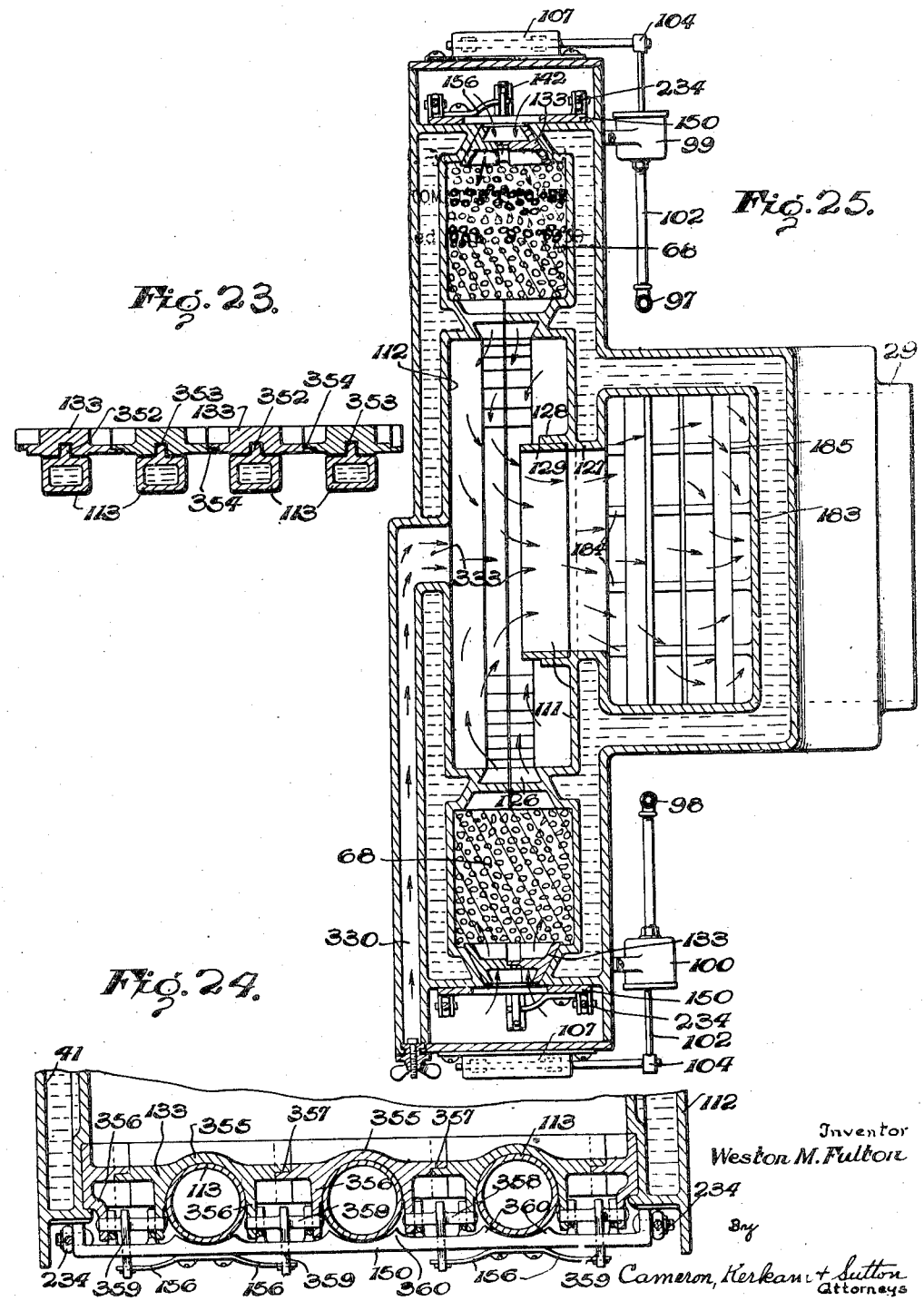

Patented Jan. 13, 1942

2,269,812

UNITED STATES PATENT OFFICE 2,269,812

AUTOMATIC STOKER

Weston M. Fulton, Knoxville, Tenn., assignor to W. J. Savage Company, Inc., Knoxville, Tenn., a corporation of Tennessee Application October 9, 1939, Serial No. 298,661

32 Claims. (Cl. 110—32)

This invention relates to automatic stokers for burning solid fuel, and more particularly to the "cross draft" type of stoker such as that generally described and shown in my U. S. Patent No. 2,126,104 granted August 9, 1938.

Cross draft stokers of the types now known and used possess a number of objectionable features. These defects and shortcomings are due in part to the stringent requirements of the domestic field in which these stokers are widely used. Domestic stokers are required to meet conditions quite different from power plant stokers. For example, domestic stokers are used principally in the heating of residences, small apartment houses, etc., where the heating load varies with the weather and consequently is subject to very wide extremes. Noise and dust must be avoided. Further domestic stokers are cared for either by the house owner or by a domestic servant, the vast majority of whom are not familiar with mechanical devices and consequently neglect the mechanical upkeep of the stoker. Power plant stokers, on the other hand, operate under more uniform load conditions; are installed in industrial plants with other noisy machinery, need not be silent and are under the constant care of a skilled power plant engineer. Power plant stokers are usually installed at the time the power plant itself is installed, whereas the vast majority of domestic stokers are installed on heating plants of varying design that have been in service for a greater or less length of time with resulting installation difficulties not found in the power plant stoker.

Another objection to known stokers of this type is their inability to remain idle for protracted periods of time when the load demand drops to, or near, zero, and then promptly resume normal functioning when the demand abruptly and drastically increases. When these stokers are standing idle it is necessary to admit an appreciable amount of air to the combustion zone to create a "natural draft" through the chimney, or smoke pipe to which the stoker is connected. Otherwise smoke and fumes arising from the incandescent fuel in the burner would escape around the access doors of the stoker and fill the furnace room and work their way up into the living quarters of the house being heated. This "natural draft" produces slow combustion of the fuel in the stoker, and, if greatly prolonged, will consume all available fuel and the fire becomes very low. When demand is resumed and fresh fuel is fed into the stoker this fuel is consumed as fast as it is fed to the stoker and the fire has great difficulty in building up again to normal proportions. This objection may be illustrated by reference to the shaker grate type of stoker in wide use in which fuel is discharged by gravity from the feed hopper to the shaker grate and moves slowly over the grate while being consumed. The rate of feed and rate of combustion are so timed that combustion will be completed as the moving fuel reaches the discharge end of the shaker grate. If the load demand drops and the stoker remains idle for a protracted period of time, the "natural draft" required to carry fumes away will consume all the fuel at the lower end of the shaker grate (this fuel having already been partially consumed), and consequently this portion of the grate will be covered with dead ash. When demand is resumed, all the cold air from the blast fan which passes through the lower portion of the grate will find no fuel with which it may combine and will mingle with the hot gases rising from the burning fuel at the upper end of the grate, cooling these gases and reducing their heating effect. Furthermore, since the rate of feed and rate of combustion are timed for normal working conditions under a fairly constant load, the feeding device is now lacking in capacity to supply sufficient fuel for actual combustion plus a surplus sufficient to again cover the lower portion of the shaker grate. Various devices such as the so-called "automatic air controls" for adjusting the air supply to correspond with the thickness of the fuel bed have been produced in an effort to cure this defect in these stokers, but these devices have met with little more than indifferent success.

Another objection to known stokers of the cross draft type, to which the present invention pertains, is that they have hitherto failed to provide ready access of air to that portion of the fuel lying against the opposing wall sections of the combustion chambers. In stokers utilizing the cross draft principle the distance between the front and rear sections of the combustion chambers must be relatively small to maintain a relatively thin fire-bed, since in a thick fire-bed the temperature of combustion reaches such a high point that large, unwieldy clinkers are formed in the combustion chambers, clogging the latter and making ash disposal difficult. Hollow, water-cooled members in close proximity to each other and in physical contact with the burning fuel have been used to rapidly conduct heat away from the fuel and prevent the temperature of the latter from rising materially above the fusing point of the ash. This expedient fails when the fire-bed is very thick since a region will still exist midway between the front and rear sections where high temperatures will prevail and objectionable clinkers will form. When a thin fire-bed is used the width of the front and rear sections of the combustion zone would be relatively large. Hence there are zones, or pockets in the fuel bed where the latter lies against these front and rear sections which the air cannot reach since the tendency of the air is to pursue a straight-line course through the fuel and the slight resistance to the progress of the air offered by the fuel in a relatively thin fire-bed is not sufficient to cause the air to diffuse in the burning zone. This results in uneven burning of the fuel, fusion and consequent sticking of the fuel in the pockets referred to and arching of the entire fuel bed in the combustion chambers.

Still another defect in known stokers of the cross draft type is that hitherto only gravity discharge of the ash has been possible. The presence of foreign matter in the fuel has resulted in clogging the ash discharge in the absence of positive mechanical means for forcing obstructions out of the path of ash flow.

Another defect in known cross draft stokers is the tendency of radiant heat to escape from the incandescent fuel through the openings of the inlet tuyères causing a substantial waste of heat. Some smoke and fumes occasionally escape through the inlet tuyères as well.

Another defect in known cross draft stokers, is that fine particles of incombustible matter given off from the burning fuel lodge in the passageways of the heater. This incombustible matter, known as "fly-ash," is greatly increased in quantity by the forced draft usually provided with these stokers. No satisfactory method has hitherto been devised for automatically disposing of this "fly-ash."

A still further defect of the known cross draft types of stokers is that a suitable amount of fire travel between the burning fuel and the heating surface of the boiler cannot be provided. To those skilled in the art it is well known that the flame generated by burning fuel is composed of a mixture of hot gases which are rapidly undergoing chemical changes and these changes proceed to completion only after the flame has travelled a considerable distance away from the burning fuel. If these hot gases come into contact with any relatively cool surface, such as the crown sheet of a boiler, and are thereby cooled below the temperature of ignition of the component gases before combustion has been completed, chemical change will be arrested and the temperature of combustion will fall short of its maximum reducing the heating effect and wasting fuel. This is a matter of such importance that heating inspectors in many localities require that all stokers installed within their jurisdiction have a specified minimum distance between the stoker or burner and the heating surface of the boiler.

It is accordingly an object of the present invention to provide a novel cross draft type of stoker which is suitable for general requirements, particularly domestic, and which is readily adaptable for use with existing heating plants.

Another object of the present invention is to provide a novel cross draft type of stoker which can after long periods of idleness promptly resume normal operation when the heat demand is increased.

Another object of the present invention is to provide a novel cross draft type of stoker in which combustion supporting gases may reach every portion of the burning zone.

Another object of the present invention is to provide a novel cross draft type of stoker in which the formation of clinkers is reduced to a minimum.

Another object of the present invention is to provide a novel cross draft type of stoker in which positive means are provided to assist the gravity discharge of ash and spent fuel to prevent arching and clogging of the ash flow.

Another and further object of the present invention is to provide a novel cross draft type of stoker in which the inlet tuyères admit suitable gases to support combustion but prohibit the escape of radiant energy.

Another and still further object of the present invention is to provide a novel cross draft type of stoker in which means are provided for the automatic removal of entrained particles and "fly-ash" from the gases of combustion.

Another and still further object of the present invention is to provide a novel cross draft type of stoker in which a suitable amount of fire travel is provided to insure complete combustion of the gases of combustion before they reach the heating surfaces.

Another and still further object of the present invention is to provide a novel cross draft type of stoker in which more fuel is supplied to the burning zones than is required for the normal operation of the stoker.

Another and still further object of the present invention is to provide a novel cross draft type of stoker in which auxiliary means are provided for removing fumes and gases generated during periods when the stoker is idling which is automatically controlled in conjunction with the dampers of the stoker.

Another and still further object of the present invention is to provide a novel cross draft type of stoker in which the cross draft is induced in rather than forced through the burning zones.

Another and still further object of the present invention is to provide a novel cross draft type of stoker in which novel means are provided for inducing the cross draft in the burning zones.

Another and still further object of the present invention is to provide a novel cross draft type of stoker in which novel means are provided for distributing the fuel to the burning zones and returning surplus fuel to the source of fuel supply.

Another and still further object of the present invention is to provide a novel cross draft type of stoker which is silent in operation, efficient, compact, relatively inexpensive to manufacture and install and which may be operated without prior knowledge or training.

Other and further objects of the present invention will appear as the description thereof proceeds.

With these objects in view, illustrative embodiments of the cross draft stoker of the present invention are shown in the accompanying drawings but it is to be expressly understood that these embodiments of the present invention are shown in the accompanying drawings and hereafter described for the purposes of illustration only and are not to be construed as limitations of the present invention. Reference should be had to the appended claims to determine the scope of the present invention.

In the accompanying drawings, Fig. 1 is a front elevation of one embodiment of the novel cross draft stoker of the present invention shown installed with a boiler of the usual type and having a portion of the front of the stoker jacket broken away to show the front of the stoker;

Fig. 2 is a side elevation as seen from the left of the embodiment of the present invention shown in Fig. 1;

Fig. 3 is a side elevation as seen from the right of the embodiment of the present invention shown in Fig. 1 with the boiler removed;

Fig. 4 is a view of the embodiment of the present invention shown in Fig. 1 as seen from above with the top of the jacket and the top of the fuel hopper broken away;

Fig. 5 is a cross sectional elevation on the line 5—5 of the embodiment of the present invention shown in Fig. 1;

Fig. 6 is a cross sectional elevation on the line 6—6 in Fig. 3 of the embodiment of the present invention shown in Fig. 1;

Fig. 7 is a sectional view on the line 7—7 of the embodiment of the present invention shown in Fig. 1, the electric motor and fan being omitted for clarity;

Fig. 8 is an isometric view of a stoker side member;

Fig. 9 is an isometric view of a stoker side member opposite the side member of Fig. 8.

Fig. 10 is an isometric view of opposite outside intermediate stoker members;

Fig. 11 is an isometric view of an inside intermediate stoker member;

Fig. 12 is a cross sectional taken on the line 12—12 of Fig. 11;

Fig. 13 is an isometric view of a movable tuyère member with one side broken away to show the internal construction;

Fig. 14 is an isometric view of a tuyère operating frame;

Fig. 15 is an enlarged view of a part of Fig. 1 showing the spring construction for holding a tuyère member to the tuyère operating frame;

Fig. 23 is a cross sectional view of a portion of the novel cross draft stoker of the present invention showing another embodiment of the side sections and tuyère members;

Fig. 24 is a cross sectional view of a portion of the novel cross draft stoker of the present invention showing still another embodiment of the side sections and tuyère members; and Fig. 25 is a sectional view of still another embodiment of the novel cross draft stoker of the present invention.

Figure 1:
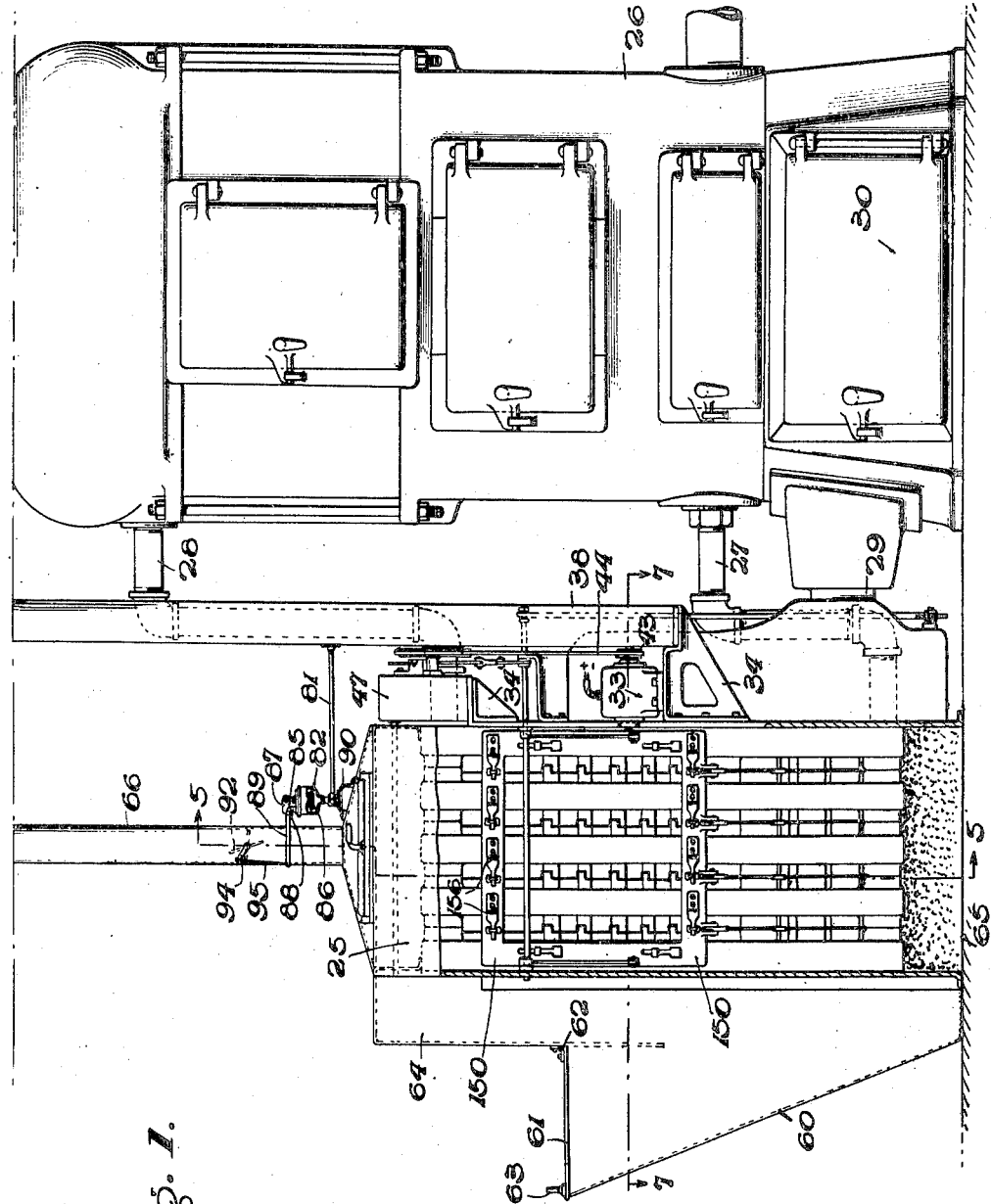
Fig. 1a is a continuing view of Fig. 1 showing a front elevation of the ejector and smoke eduction passages.

Referring now to the accompanying drawings in which like reference characters indicate similar parts and more particularly to Figs. 1 and 2, the stoker 25, made up of hollow sections which will be described hereafter in detail is connected to the boiler 26 by means of pipes 27 and 28, in accordance with the practice known to the art for stokers of this type to permit free exchange of water and steam between the boiler and stoker. Combustion of fuel takes place in the stoker 25 and the hot products of combustion pass through the stoker outlet 29 into the ash pit 30 of boiler 26 thence upward through the heating passageways of boiler 26 and out through the smoke-hood 31 to smoke-pipe 32. It has hitherto been the practice to apply forced draft to stokers of this type. In the present invention, an induced draft is used. To create the desired induced draft an electric motor 33, supported on bracket 34 attached to stoker 25, carries the rotor 35 of a blower 36 on the end motor shaft 37. Blower 36 discharges air through pipe 38 into the air intake 39 of ejector 40 which is in communication through chamber 51 with suction chamber 42. Pipe 41 is connected to said suction section 42 of ejector 40 and the gases are delivered through pipe 32 to any suitable chimney or stack (not shown). Motor shaft 37 has pulley 43 keyed thereon and belt 44 transmits power from pulley 43 to pulley 45 which is keyed to shaft 46 of speed reducer 47 of any standard construction.

Referring more particularly now to Figs. 1 and 2, fuel hopper 60 is provided with lid 61 hinged at 62 and provided with a handle 63. A metal jacket, or covering, 64 surrounds stoker 25 and extends to the bottom 65 thereof to form a substantially air-tight closure around stoker 25. At the top of jacket 64, and in communication with the interior thereof, is vent pipe 66. Pipe 66 leads to any suitable outlet such as the chimney used with boiler 26; it may connect to ash pit 30 of boiler 26; or, as here shown, it may connect at 67 to smoke pipe 32. Jacket 64 has adjacent its top, and immediately above combustion chambers 68 (Fig. 5), two openings 69, which are provided with lids 70 hinged at 71 and provided with handle 72. Handle 72 has a round extension 73 journalled in lug 74 integral with lid 70. Extension 73 carries latch 75 which, when lid 70 is closed, can be rotated to engage reinforcing member 80. Each lid 70 is opened by rotating handle 72 to disengage latch 75 and lid 70 can then be raised to the open position shown in dotted outline at the left in Fig. 5. This arrangement permits access to combustion chambers 68 for starting the fire in the stoker and gives access to the working parts.

Connected to air duct 38, and in communication with the interior thereof, is pipe 81 which takes air under pressure from duct 38 to any suitable pressure responsive device 82 here shown as comprising a cast iron housing 83 inclosing bellows member 84 having a plunger 85 attached to its movable wall. Plunger 85 pivotally engages member 87 which in turn is mounted upon pivot 88 and carries a lever arm 89. Pressure responsive device 82 is supported in any suitable way here shown as by bracket 90 suitably secured to jacket 64 as by screws or rivets 91. Mounted in vent pipe 66 is damper 92 supported on pivot 93 to which is secured operating arm 94. Arm 94 pivotally engages link 95 which is in turn in pivotal engagement with lever arm 89 of the pressure responsive device 82.

Referring now to Figs. 3, 4, 5 and 7, in communication with air duct 38 is pipe 96 communicating in turn with branch pipes 97 and 98 leading to suitable pressure responsive devices 99 and 100, here shown as of similar construction to pressure responsive device 82. Pressure responsive devices 99 and 100 are provided with plungers 102, pivotally connected at 103 to damper arms 104. Pressure responsive devices 99 and 100 are attached to stoker 25 by brackets 105. Suitable dampers 106 are mounted in housings 107 provided with flanged portions 108, by which housings 107 are suitably secured to jacket 64 by screws, rivets or other suitable means. Housings 107 enclose suitable openings 109 (Fig. 5) which are provided in jacket 64 for the admission of air to support combustion in stoker 25. Dampers 106 are provided with trunnions 110 which are mounted in the ends of housings 107 for rotation therein. Damper arms 104 are secured to one end of trunnions 110 to enable pressure responsive devices 99 and 100 to operate dampers 106.

Referring now to Figs. 1 to 12, inclusive, it will be seen that the combustion chambers 68 of my improved stoker are built up of a plurality of hollow sections spaced from each other and secured together by a plurality of hollow nipples which are screwed into suitable threaded bosses or openings in each section. As shown in Fig. 7, hollow side sections 111 and 112 (Figs. 8 and 9) have mounted therebetween one or more hollow outside sections 113 (Fig. 10) and an equal number of inside hollow sections 114 (Fig. 11). Combustion takes place in the combustion chambers 68, inclosed by side sections 111 and 112, outside sections 113 and inside sections 114, and the hot gases from the burning fuel pass out through the central chamber 116 formed by inside sections 114. Outside sections 113 are identical in construction having their lower portions 117 downwardly and inwardly inclined towards the middle of the burner so that lower portions 117 are closer at their lower extremities than at their upper extremities. Referring to Fig. 12, inside sections 114 are hollow to provide passages 118 through which water can freely circulate. Inside sections 114 have ribs 119 formed integrally therewith the spaces 120 between ribs 119 constituting tuyères through which the hot gases of combustion enter central chamber 116. Side sections 111 and 112 have ribs 125 formed integrally therewith having spaces 126 therebetween which when assembled form companion tuyères with those formed by the inside sections 114.

Side section 111 has therein a suitable opening 127 surrounded by extension 128 into which is fitted a suitable member 129 suitably secured thereto, by any convenient means here shown as by screws 130, and extending into chamber 116. Member 129 forms an outlet through which the gaseous products of combustion pass in their travel to boiler 26. Member 129 may be made of any suitable heat-resisting material such as fireclay or any of the heat-resisting alloys. Member 129 is so designed that the hot gases of combustion emerging from tuyères 126 nearest opening 127 must travel to the opposite side of stoker 25 before escaping through open end 131 of member 129 to give the gaseous products of combustion a long path of travel and ample time in which the chemical reactions of combustion may be completed before the gaseous products of combustion come into contact with the relatively cool interior passageways of boiler 26. As member 129 is exposed to the hot gases of combustion emerging from tuyères 126 its outer and inner surfaces are maintained at high temperatures. The gases in contact with and surrounded by these surfaces will therefore be held at a temperature above the temperature of ignition of the component elements of the gases until they emerge from opening 127. Adequate fire travel to insure complete combustion is thus provided by the present invention.

Inside sections 114 are V-shaped in cross section (Figs. 7 and 11) with the top of the V pointing towards combustion chambers 68. Outside sections 113 are also V-shaped with the top of the V pointed towards combustion chambers 68. Sections 113 have no tuyère forming ribs. Hollow hubs 132 (Fig. 10) formed on sections 113 project a sufficient distance beyond the sides of sections 113 to form suitable spaces therebetween in which oscillating tuyère members 133 (Figs. 5, 7 and 13) are mounted for reciprocation. As shown in Fig. 13 tuyère members 133 comprise two side elements 134 and 135 having cooperating ribs 136 and 137 suitably lapped at 138 and 139 to form a fuel-tight joint. These joints provide any adjustment necessary to counteract expansion and contraction of ribs 136 and 137 caused by their exposure to heat and also provide an adjustment for wear. When tuyère side elements 134 and 135 are assembled a tuyère structure is formed which is generally V-shaped in cross section to fit snugly in the spaces between the sides of V-shaped outside sections 113 and of sufficient thickness to extend inwardly beyond sections 113 into contact with the burning fuel in combustion chambers 68. Tuyère elements 134 and 135 are apertured at 140 (Figs. 5 and 13) to carry rods 141 which in turn carry links 142 pivotally mounted thereon. Tuyère elements 134 and 135 are also apertured at 143 to carry rods 144 which in turn carry links 145 pivotally mounted thereon. Each one of ribs 136 and 137 of tuyère elements 134 and 135 is composed of an upwardly inclined portion 146 and a downwardly inclined portion 147. Air entering combustion chambers 68 through tuyères 133 is therefore forced to first travel upwardly and then downwardly. The outer upwardly inclined portions 146 act as baffles to intercept the rays of radiant heat which would otherwise escape from the incandescent fuel in chambers 68. This radiant heat arrested by upwardly inclined portions 146 is absorbed by the relatively cold entering air as it impinges against these surfaces and is thus returned to the burning fuel to add to its heating effect. The downwardly inclined portions 147 act to prevent fuel from entering and passing outwardly through tuyères 133.

Referring now to Figs. 8 and 9, the flat faces 148 of side sections 111 and 112 are provided with T-shaped lugs 149. A suitable rectangular frame 150 (Figs. 1, 5, 7 and 14) has slots 151 designed to engage lugs 149. Fig. 14 is an isometric view of frame 150. Slots 151 are enlarged at 152 to permit the T-heads of lugs 149 to pass therethrough. When frame 150 is moved downwardly the sides of slots 151 pass beneath the T-heads while the smaller body portions of lugs 149 fit in slots 151. The reduced portions of slots 151 are of suitable length to allow frame 150 to oscillate within its required range of movement without the T-heads of lugs 149 entering openings 152. Lugs 149 serve to guide frame 150 in true rectilinear movement and to retain it in sliding contact with faces 148 of sections 111 and 112. Frame 150 has also therein rectangular openings 153. Arranged on each side of upper openings 153 are suitably formed prong members 154 and 155 which project perpendicularly from the rear surface of frame 150. Fig. 15 is an isometric view of a portion of frame 150 showing the arrangement of the several parts when frame 150 is in operating position as shown in Figs. 1, 5 and 7. Suitable resilient strips 156 are suitably secured to frame 150 as by screws or rivets 157, and are so arranged that ends 158 of strips 156 pass through suitable openings 159 in the outer ends of links 142 which are designed to protrude through openings 153. As described above, the inner ends of links 142 pivotally engage rods 141 which in turn engage tuyère members 133. The force exerted by strips 156 therefore acts to draw tuyère members 133 snugly into the spaces between outside sections 113. A firm contact between tuyère members 133 and the side surfaces of outside sections 113 is insured. Any wear of the contacting surfaces will be taken up by strips 156. The firm contact between tuyères 133 and sections 113 enables hollow water cooled sections 113 to conduct heat away from tuyère members 133 at a sufficiently rapid rate to prevent the latter from becoming overheated and permanently damaged.

Prong members 154 and 155 straddle links 142 and engage rods 141 between their upper and lower prongs. Lower openings 153 of frame 150 correspond in number and are correspondingly arranged to openings 153 in the upper portion of frame 150 and are provided with similar springs or strips 156 (Fig. 1) engaging the outer ends of links 145 to draw the lower ends of tuyère members 133 snugly into place between stoker sections 113 to insure continuous contact between the side walls of sections 113 and tuyère members 133 throughout the entire length of the latter. Lower openings 153 are not provided with prong members corresponding to members 154 and 155 since the latter are sufficient to impart movement to tuyères 133. When frame 150 is reciprocated, as will be hereafter described, a like movement is imparted to tuyère members 133.

Secured to frame 150 are bifurcated lugs 160 projecting therefrom. Pivotally mounted in bifurcated lugs 160 on pins 161 are links 162 which are longitudinally slotted at 163 for engagement with pins 161. Links 162 have mounted therein and extending into slots 163 screws 164 whose diameter is approximately equal to the width of slots 163 to provide regulation of the effective length of slots 163. Links 162 are pivoted at 165 to rods 166 which in turn engage lower tuyère members 167. Lower tuyère members 167 slidably engage and rest upon the sides of the lower inwardly inclined portions 117 of sections 113 and are held in contact therewith by their own weight plus the weight of fuel resting upon them. Spaces 168 (Fig. 5) between the lower end of tuyères 133 and the upper end of tuyères 167 are bridged by plates 169 hinged at 170 to the bottom of tuyères 133, and having their lower ends slidably engaging the upper portion of tuyères 167. Plates 169 are designed to bridge spaces 168 during reciprocation of tuyères 133 and 167.

Referring more particularly to Figs. 5, 8 and 9, formed adjacent the lower ends of side sections 111 and 112 are plates 171. Plates 171 are provided with offsets 172 having extensions 173. Also formed on sections 111 and 112 are lugs 174 designed to receive plates 175 positioned between sections 111 and 112, plates 175 having their upper ends supported by lugs 174 and their lower ends supported in offsets 172. Plates 175 catch any dust or ash which may sift through tuyères 133 and direct this waste matter downward into the ash discharge. Suitably secured to plates 171 are curved plates 176 which close the space between sections 111 and 112 and extend forwardly to a point adjacent the front of the stoker. Plates 176 deflect the ash traveling downward from combustion chambers 68 into opening 177 of a suitable ashpit 178. Plates 176 are here shown secured to the left sides (Fig. 5) of sections 111 and 112 but it is to be understood that plates 176 can be connected at the right if desired. Ashpit 178 would then be located near the left side of Fig. 5 this feature rendering installation of the stoker more flexible.

As is best seen in Figs. 5 and 6, a suitable member 179 is spaced from and covers the top of stoker sections 114 providing a suitable space 180 around it in which scrapers 181 may move with ample clearance. Member 179 prevents fuel from accumulating in the space on top of stoker sections 114.

Stoker side section 111 is provided with a hollow, water-cooled outlet 29 (Figs. 3, 6 and 7) for conducting the hot gaseous products of combustion from outlet 127 and member 129 into boiler 26. Outlet 29 is of suitable cross section here shown as rectangular and is downwardly directed to deliver the hot gases of combustion at, or near, the bottom of boiler 26, as may be seen in Fig. 1. Outlet 29 has vertically disposed ribs 184 and 185 suitably secured to opposite walls 182 and 183 to which are attached cross members 186 and 187 forming dust-collecting passages 188 and 189 therebetween. Cross members 186 and 187 have their upper edges turned outwardly towards the center of outlet 29 and are suitably separated from each other to form traps by which fly-ash and dust particles may enter passages 188 and 189. Passages 188 empty into a suitable passage 190 which in turn empties into dust-collecting chamber 191. Passages 189 are divided at 192 into two branches 193 (Fig. 3) which straddle outlet 29 and discharge into dust chamber 191. A suitable passage 194 connects dust chamber 191 and outlet 29. The area of passage 194 is greater than the area of passage 190. When induced suction or draft is applied to outlet 29 through boiler 26 to which it is connected, gases can escape from dust chamber 191 through passage 194 faster than they can enter through passage 190 producing a reduced pressure inside chamber 191. Mounted in chamber 191 is conveyor screw 195 journalled at 196 in wall 197 of chamber 191 and having its discharge end 198 loosely mounted in a suitable cylindrical hub 199 opening into ash discharge passage 200. End 198 of screw 195 terminates short of the entrance of hub 199 into ash discharge passage 200 to permit a suitable quantity of dust or fly-ash to accumulate in hub 199 to form a seal or plug to prevent air from being drawn into chamber 191 through ash discharge 200. As will be described hereafter in more detail, a ratchet wheel 210 is secured to screw 195 and is positioned between the bifurcations of lever 211 and is engaged by pawl 212 secured to lever 211.

Referring now to Figs. 1-3, 14 and more particularly Fig. 3, speed reducer 47 has a suitable reduced speed shaft 203 on which is mounted a suitable cam 214 provided with a cam groove 215. Rod 216 mounted for reciprocation in brackets 217 has rotatably mounted thereon a suitable roller 218 designed to engage and travel in cam groove 215. Rod 216 pivotally engages arm 219 of crank 220. Pivotally engaging arm 219 of crank 220 is rod 221 which in turn pivotally engages arm 222 of crank 223. Crank 220 is fixed to shaft 224 which is journalled in bracket 225 attached to stoker 25. Crank 223 is fixed to shaft 226 which is journalled in bracket 227 also attached to stoker 25. Shaft 224 has fixed thereto crank arm 228. Pivotally engaging arm 228 is rod 229 which in turn pivotally engages lever 211 above described. As above described lever 211 is bifurcated at its opposite end and the bifurcations are loosely journalled on screw 195. Between the bifurcations, and fixed to screw 195, is ratchet wheel 210 whose teeth are engaged by pawl 212 urged into engagement with ratchet wheel 210 by spring 230. Bearings 231 (Figs. 8 and 9) are provided in side sections 111 and 112 to support shafts 224 and 226. Shafts 224 and 226 extend across from stoker side section 111 to side section 112 and are suitably spaced from the outer edges of intermediate sections 113. Fixed to shafts 224 and 226 are crank arms 232 and 233 (Fig. 5) which pivotally engage rods 234 and 235 which in turn pivotally engage bifurcated lugs 236 (Fig. 14) of frame member 150.

Referring to Figs. 4, 5 and 6, a second reduced speed shaft 213 of speed reducer 47 passes through jacket 64 and is journalled in bracket 237 fixed to top member 238 of fuel hopper 60. Suitable packing means may be used to insure a gastight joint where shaft 213 passes through jacket 64. Secured to shaft 213 is bevel pinion 240 which meshes with pinion 241 fixed to drive shaft 242 of conveyor screw 243. Spur gear 244 likewise fixed to conveyor shaft 242 meshes with idler gear 245 which in turn meshes with spur gears 246 and 247. Gear 246 is fixed to drive shaft 248 of secondary conveyor screw 249. The general construction and operation of conveyor screws 243 and 249 here shown and generally described is the same as that shown and described in detail in my copending application Serial No. 253,930, filed January 31, 1939, for "Improvements in feeders." A spider frame 260 has four arms 261 secured to the lugs 262 formed on side sections 111 and 112. Fixed to spider frame 260 are studs 263 to which are journalled sprockets 264 and 265. Spur gear 247 is fixed to shaft 266 which rotates in its stud 263 and carries sprocket 264 fixed thereto. The other sprockets 265 turn idly on their studs 263. Sprocket 264 drives sprocket chain 267 and sprockets 265 support and stretch chain 267. Chain 267 carries a plurality of scrapers 181 pendant therefrom.

As is well known to those skilled in the art to which this invention pertains, stokers of this type are controlled by an electric switch in turn controlled by any convenient means such as a thermostat located in the building being heated. Assuming that the temperature in the region of the thermostat has fallen sufficiently to close the electric switch and admit electricity to motor 33, the latter will rotate blower 36 and supply air to duct 38 at a pressure above atmospheric pressure. Pipes 81, 96, 97 and 98 will conduct air under pressure to pressure responsive devices 82, 99 and 100, compacting the bellows and moving plungers 85 and 102 outward. Outward movement of plunger 85 will rotate rocker 87 about pivot 88 and rotate lever 89 and move link 95 downward rotating damper 92 to the dotted position shown in Fig. 1 obstructing the flow of gases through vent pipe 66. Vent pipe 66 carries away from jacket 64 all gases, smoke, fumes, etc., which may escape from stoker 25 only while the latter is idle. Simultaneously pressure responsive devices 99 and 100 will rotate dampers 106, to the dotted positions shown in Fig. 5 to admit air to assist combustion in the stoker. As soon as the temperature in the region of the thermostat has risen sufficiently to cause the thermostat to open the electric circuit motor 33 will cease driving blower 36 and the pressure in pressure responsive devices 82, 99 and 100 will drop. The resilient walls of the bellows members will expand them to their normal positions rotating damper 92 to its open position and rotating dampers 106 to their closed positions. Free flow of gases will now take place through vent 66, and no air will be admitted through openings 109 to support combustion. This novel method of handling the air for combustion and the escaping fumes of a stoker accomplishes the very desirable result of preventing the escape of noxious fumes in the boiler room (which is always objectionable and, in the case of residences, is prohibitive), and, at the same time, automatically provides air for combustion when the stoker is in operation and reduces combustion to a minimum when the stoker is idle.

Assuming that the above described embodiment of the present invention is set up as above described, to place it in operation lids 70 of jacket 64 (Fig. 5) are opened and pieces of ignited material (paper, excelsior, wood shavings, etc.) are dropped into combustion chamber 68 followed by wood kindling, after which coal (or other solid fuel) is supplied with a shovel until chambers 68 have been filled up to the level of the lower edges of scrapers 181. Lids 70 are then closed and secured by turning handles 72 to rotate latches 75 into engagement with members 80. Electric motor 33 is then started putting blower 36 into operation and closing damper 92 in vent pipe 66 and opening dampers 106 in the lower sides of jacket 64. The air supplied through air duct 38 from blower 36 to ejector 40 produces an induced draft or suction in smoke-hood 31, in boiler 26 and in stoker 25 causing air to be drawn in through damper openings 109, through tuyères 133 through the burning fuel in chambers 68, and causing the hot gases of combustion to be drawn through tuyères 126 through cylindrical member 129 and through outlet member 29 into boiler 26 as indicated by arrows in Figs. 5, 6 and 7. This vigorous indraft of air through the stoker causes the fuel in combustion chambers 68 to ignite rapidly until combustion is taking place throughout combustion chambers 68 up to the zones indicated by dotted lines 270 (Fig. 5). As there are no inlet and outlet tuyères above the zones indicated by lines 270 the fuel in this space receives insufficient air to support combustion. Particles of dust, or "fly-ash," that may be held in suspension in the hot gaseous products of combustion are thrown out of the gaseous stream in turning the reverse curve in outlet member 29 at high velocity by the action of centrifugal force and are caught by the outwardly protruding edges of cross members 186 and 187 and deflected through the passages between these cross members into the passages 188 and 189. The reduced pressure in dust chamber 191 causes the particles thus trapped to be drawn or sucked through passages 190 and 193 into dust chamber 191. At the same time that electric motor 33 starts blower 36 it drives pulley 45 of speed reducer 47 through belt 44 driven by pulley 43 secured to motor shaft 37. Reduced speed shaft 203 (Fig. 3) is rotated, rotating cam 214 and imparting rectilinear reciprocating movement to rod 216 which in turn oscillates crank 220 and, through rod 221, likewise oscillates crank 223. Oscillation of cranks 220 and 223 rocks shafts 224 and 226 oscillating cranks 232 and 233. Oscillation of cranks 232 and 233 reciprocates connecting rods 234 and 235 reciprocating frame 150. Reciprocation of frame 150 reciprocates tuyère members 133 through engagement of rods 141 and prong members 154 and 155. Simultaneously pins 161 carried by bifurcated lugs 160 acting against the upper and lower limits of slots 163 in links 162 cause lower tuyère members 167 to reciprocate. The length of stroke of tuyère members 167 is regulated by adjusting screws 164. When screws 164 are turned inward to reduce the effective length of slots 163 the amount of lost motion permitted pins 161 is reduced and the length of stroke of lower tuyère members 167 is correspondingly increased. Turning screws 164 outward increases the lost motion and decreases the length of stroke of lower tuyère members 167.

Reciprocation of tuyères 133 produces many desirable results heretofore not obtained. It agitates the fuel in combustion chambers 68 breaking up arching, prevents formation of holes in the fuel bed due to "burning through" and works the fuel downward in combustion chambers 68. Reciprocation of tuyères 133 also produces a better distribution of air entering the fuel bed by constantly moving the tuyère openings to different positions relative to the fuel. As the fuel is worked downward in chambers 68 and combustion proceeds the fuel is reduced to ashes and its volume is reduced. Because of this reduction in volume the rate of movement of the contents of combustion chambers 68 must decrease towards the bottom of chambers 68. To accomplish this reduced rate of movement of the fuel lower tuyères 167 are provided with the lost motion attachment above described so that they may be adjusted to reciprocate through a shorter distance than upper tuyères 133. Lower tuyères 167 terminate at their lower ends in ribs 271 which act to push, or "kick," the ashes from combustion chambers 68 into the ash discharge outlet 200. The ashes are thus positively ejected from the burner and may be disposed of in any way desired such as shown by allowing them to fall through an opening 177 into a suitable ashpit 178. Screws 164 afford an adjustment for the amplitude of reciprocation of tuyères 167 and so also for ribs 271 thus providing an adjustment for the rate of discharge of the ashes.

Because stoker sections 133 are V-shaped in cross section the incoming air in passing through tuyères 133 which are likewise V-shaped in cross section is allowed to spread laterally before it reaches the fuel in combustion chambers 68. The V-shaped cross section of center stoker sections 114 allows the gaseous products of combustion to converge after passing through the fuel in combustion chambers 68 before entering chamber 116. Air is therefore conducted to every portion of the burning fuel in chambers 68 preventing the formation of pockets of unburnt fuel and increasing the efficiency of the stoker.

Reciprocating movement of rod 216 imparts oscillating movement to crank arm 228 and through it reciprocates rod 229 and oscillates lever 211 causing the latter to slowly rotate ratchet wheel 210 rotating conveyor screw 195 to discharge fly-ash from chamber 191 into ash discharge 200. Automatic disposal of dust and fly-ash is therefore provided.

Simultaneously with the operations just described, reduced speed shaft 213 (Fig. 6) rotates bevel pinions 240 and 241 and rotates conveyor screws 243 and 249 which in turn elevate fuel from hopper 60 and discharge it into the space 180 at the top of the stoker. This fuel is then picked up by scrapers 181 and distributed uniformly around the space 180, scrapers 181 being driven by sprocket chain 267, sprocket wheel 264, and gear wheels 244, 245 and 246. The speed of shaft 213 is so adjusted with respect to the gear ratios that conveyor screws 243 and 249 will supply fuel to stoker 25 faster than stoker 25 can consume it. The surplus fuel not consumed is carried around space 180 by scrapers 181 and discharged over wall 336 (Fig. 4) back into the hopper 60. When the stoker of the present invention remains idle for prolonged periods of time the fuel in space 180, above the dotted lines 270, serves as a reserve to replenish the fuel consumed by the slow combustion in combustion chambers 68 resulting from natural draft, and as this reserve is slowly consumed the fuel level in space 180 drops down towards dotted lines 270. When demand for heat is resumed and the stoker is again put into operation conveyor screws 243 and 249 supply fuel faster than it can be consumed and space 180 is quickly refilled and the fuel level is brought back up to the bottom edges of scrapers 181, after which the surplus fuel is again discharged back into hopper 60, as described. It is to be understood that while in the preferred embodiment of the present invention the surplus fuel is returned to the hopper it may be disposed of in any other way desired as for example by discharging it into a separate bin, or hopper, provided for that purpose.

Figure 16:
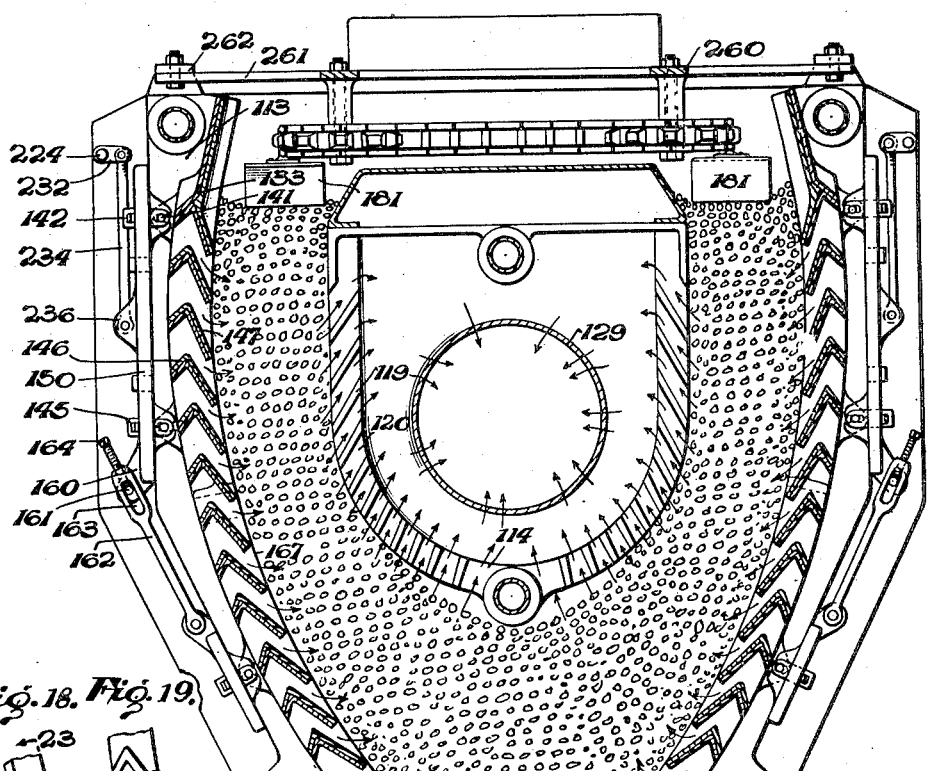
Fig. 16 is a cross sectional elevation of another embodiment of the novel cross draft stoker of the present invention.
Figures 17, 21:
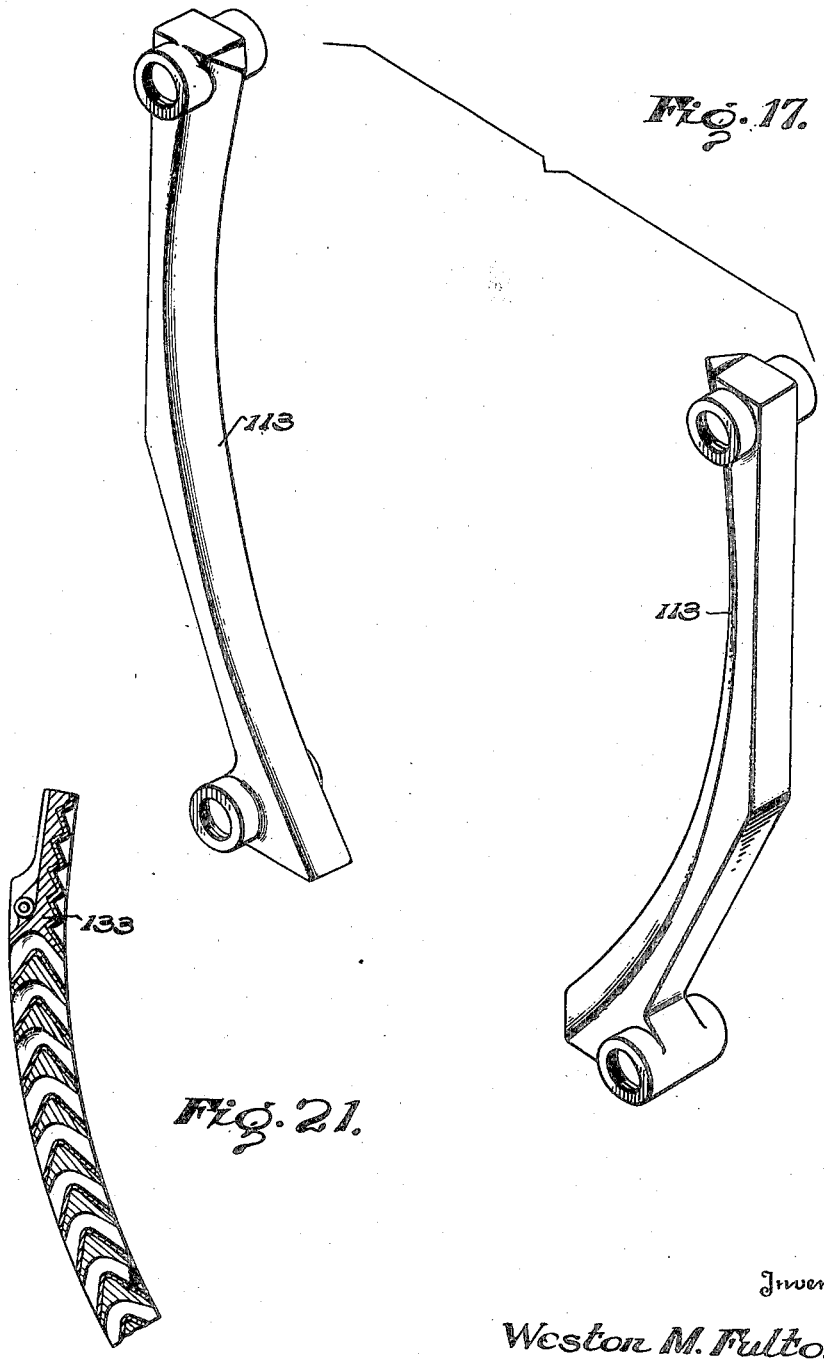
Fig. 17 is an isometric view of opposite outside intermediate members used with the embodiment of the present invention shown in Fig. 16.
Fig. 21 is an isometric view of a modified tuyère member suitable for use with the embodiment of the present invention shown in Figs. 1 and 16.

Fig. 17 shows a modified form of outside stoker sections 113. Comparing Fig. 17 with Fig. 10, it will be noted that the outside stoker sections 113 of Fig. 17 differ from those of Fig. 10 in that the V-shaped surfaces of the sections of Fig. 17 are struck on a radius so that they are arcuate in form instead of having the lower portions 117 (Fig. 10) turned inwardly, at an abrupt angle. Fig. 16 is a cross sectional view of the stoker showing the appearance of sections 113 shown in Fig. 17 when assembled. When sections 113 of Fig. 16 are used, upper tuyère members 133 and lower tuyère members 167 are struck on the arc of a circle to conform to the stoker sections and operate in a manner similar to that described with reference to Fig. 5, lower tuyère members 167 being adjusted to reciprocate through smaller amplitudes than tuyère members 133.

Figures 18, 19:
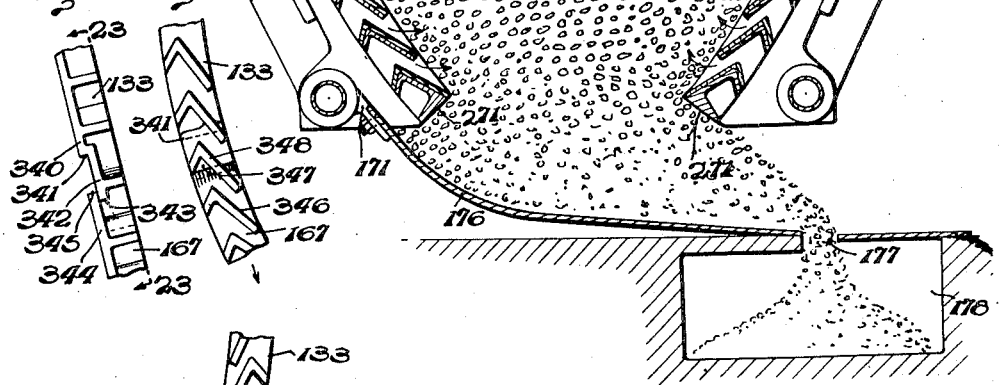
Fig. 18 is a more detailed view of a part of Fig. 16 showing a portion of an upper and a lower tuyère member when separated as seen from the front.
Fig. 19 is a sectional view on the line 19—19 of Fig. 18.
Figure 20:
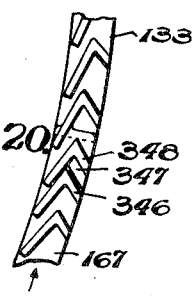
Fig. 20 is a sectional view of a portion of an upper and a lower tuyère member when in closed position.

Referring to Figs. 18 and 19, when upper tuyère members 133 are at their maximum upper limits of oscillation and adjusting screws 164 are so adjusted that pins 161 contact the upper limits of slots 163 in links 162, then lower tuyère members 167 occupy the positions shown. The solid or web portions 340 of upper members 133 are offset at 341 and have downwardly extending portions 342 terminating at 343. Webs 344 of lower tuyère members 167 have their upper ends 345 in overlapping relation with extensions 342 of webs 340. Upper tuyères 346 of lower tuyère members 167 are withdrawn from the concave spaces 347 beneath tuyères 348 of upper tuyère members 133 until the latter just overlaps the former to prevent the escape of fuel between the tuyères. Referring now to Fig. 20, the relative positions of upper tuyère members 133 and lower tuyère members 167 are shown when upper tuyère members 133 are at their farthest limit of downward movement and pin 161 is in contact with the bottom of slot 163. In this position the upper ends 345 of webs 344 of lower tuyère members 167 nearly contact offsets 341 of webs 340 of upper tuyère members 133, and tuyères 346 of lower tuyère members 167 occupy the concave spaces 347 beneath tuyères 348 of upper tuyère members 133. When adjusted as just described, upper tuyère members 133 would impart no oscillating movement to lower tuyère members 167. By turning screw 164 inwardly to reduce the length of slot 163 oscillating movement will be imparted to lower tuyère member 167, and the amplitude of this oscillation will be increased in proportion to the inward adjustment of screw 164.

Fig. 21 shows a short section of a modified tuyère member 133. By comparing the shape of the ribs shown in Fig. 13 with those shown in Fig. 21, it will be seen that the ribs shown in Fig. 21 are curved in cross section instead of V-shaped. Instead of comprising an upwardly disposed portion 146 which makes an acute angle with a downwardly disposed portion 147 as in Fig. 13, the ribs in Fig. 21 form a U-bend in cross section eliminating all sharp angles along the course pursued by the air in passing through the tuyères.

Figure 22:
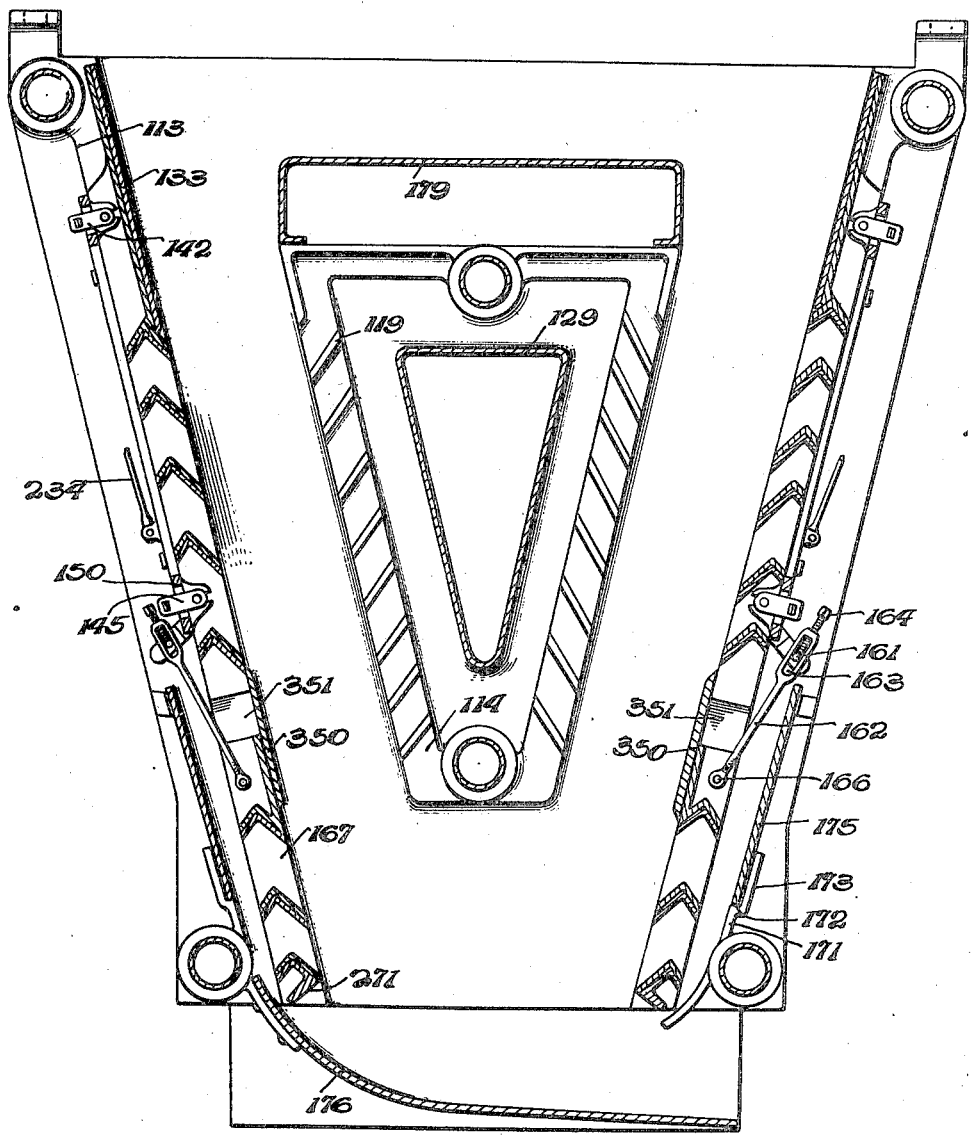
Fig. 22 is a cross sectional elevation of another embodiment of the novel cross draft stoker of the present invention.

Fig. 22 shows another embodiment of the novel cross draft stoker of the present invention which, while operating in the same manner as above described with reference to the embodiment of the present invention shown in Figs. 1–7, has outside sections 113 arranged rectilinearly in their lengthwise direction without the downwardly and inwardly projecting portions 117. Tuyère members 133 and 167 are mounted for reciprocation between rectilinear outside sections 113, all as described above. Aprons 350, similar to plates 169, are formed integral with or suitably secured to upper tuyère members 133 to close gap 351 between the upper and lower tuyère members to prevent the escape of fuel. Inside sections 114 and conduit 129 are arranged to have adjacent surfaces in substantially parallel relation with sections 113.

Fig. 23 is a cross section of a portion of another embodiment of the present invention in which the side sections 113 and tuyère members 133 are not triangular in cross section as described with reference to Figs. 1–10. In this embodiment outside sections 113 are rectangular in cross section and hollow to permit the circulation of a cooling medium and are provided with longitudinal ribs 352. Tuyère members 133 are mounted for reciprocation on outside sections 113 and are provided with longitudinally extending grooves 353 designed to receive ribs 352. Tuyère members 133 interengage at 354 and are provided with suitable tuyère openings as described with reference to Fig. 13.

Referring to Fig. 24 another embodiment of the novel cross draft stoker of the present invention is here shown. In this embodiment outside sections 113, supported between side sections 111 and 112, are hollow and circular in cross section. Tuyère members 133 are suitably shaped at 355 to slidably engage outside sections 113 and are provided with portions 356 designed to embrace sections 113. Tuyère members 133 interengage at 357 and are provided with suitable tuyère openings as described with reference to Fig. 13. Mounted in adjacent portions 356 are pins 358 upon which are mounted links 359 designed to pass through suitable slots in frame 150 and be engaged by suitable resilient strips 156 as described with reference to Figs. 14 and 15. Frame 150 is suitably shaped at 360 to partially embrace sections 113. Frame 150 is reciprocated by rods 234 and reciprocates tuyère members 133 as described above.

Fig. 25 is a cross sectional view of another embodiment of the present invention taken on the same line as that of Fig. 7. This embodiment of the novel cross draft stoker of the present invention is particularly suited for smaller types of installation. In this embodiment the outside sections 113 are omitted and but one tuyère member 133 is used for each combustion chamber, tuyère member 133 being mounted for reciprocation on suitable surfaces formed on side members 111 and 112. The operation of this embodiment of the present invention is in every way similar to that described with reference to Figs. 1–10 and need not be further described.

Some fuels having very high volatile constituents require more or less air to be admitted to the hot products of combustion after they emerge from the combustion chambers. As seen in Figs. 7 and 8 a passage 330 is provided in the side of stoker section 112 and is closed by a sliding gate 331 operated by clips 332. Gate 331 fits tightly in its slots and is held by friction in any desired position. Passage 330 leads to a suitable opening 333 located at, or near, the center of the stoker. Gate 331 can be set to admit the proper amount of air for the needs of the particular fuel in use.

In some installations using certain types of fuel it may be desirable for the upward movement of tuyères 133 and 167 to be more rapid than their downward movement. Cam 214 may be given any suitable shape to provide this differential.

It will now be apparent that the present invention provides a novel cross draft type of stoker which is particularly suited for domestic installation; which is silent, efficient, compact, relatively inexpensive and flexible in installation; which can, after periods of idleness, promptly resume normal operation; in whch combustion supporting gases reach every portion of the burning zone to reduce the formation of ashes and clinkering; in which positive means are provided to assist the gravity discharge of ash; and in which automatic means are provided for removing entrained particles in the gases of combustion. The present invention further provides a novel cross draft type of stoker in which a suitable amount of fire travel is provided to insure complete combustion of the gases of combustion; in which more fuel is fed to the burning zones than is required for the normal operation of the stoker; in which novel means are provided for distributing the fuel to the burning zones; in which auxiliary means are operated in conjunction with the dampers of the stoker to remove fumes and gases when the stoker is idling; and in which novel means are provided for inducing the draft in the stoker.

To those skilled in the art changes to or modifications of the above described illustrative embodiments of the present invention will now be suggested without departing from the inventive concept of the invention. To determine the scope of the present invention reference should be had to the appended claims.

What is claimed is:

1. In a cross draft stoker spaced end members, spaced side members supported between said spaced end members and tuyère members mounted for reciprocation between said spaced side members.

2. In a cross draft stoker spaced end members, spaced side members supported between said spaced end members, downwardly and inwardly disposed portions formed on said side members, upper tuyère members mounted for reciprocation between said spaced side members and lower tuyère members mounted for reciprocation on said downwardly and inwardly disposed portions.

3. In a cross draft stoker spaced end members, spaced arcuate side members supported between said spaced end members and arcuate tuyère members mounted for reciprocation between said spaced arcuate side members.

4. In a cross draft stoker spaced end members, spaced side members supported between said spaced end members, downwardly and inwardly disposed portions extending from said side members, tuyère members mounted for reciprocation between said spaced side members, lower tuyère members mounted for reciprocation on said inwardly disposed portions, means for reciprocating said first named tuyère members and means operated by said first named tuyère members for reciprocating said second named tuyère members.

5. In a cross draft stoker spaced end members, spaced side members supported between said spaced end members, downwardly and inwardly disposed portions extending from said side members, tuyère members mounted for reciprocation between said spaced side members, lower tuyère members mounted for reciprocation on said inwardly disposed portions, means for reciprocating said first named tuyère members and adjustable means operated by said first named tuyère members for reciprocating said second named tuyère members whereby said second named tuyère members may be adjustable to reciprocate through smaller amplitudes than said first named tuyère members.

6. In a cross draft stoker spaced hollow end members, spaced hollow side members supported between said spaced end members, downwardly and inwardly disposed hollow portions extending from said side members, tuyère members mounted for reciprocation in heat conducting relation between said spaced side members, lower tuyère members mounted in heat conducting relation for reciprocation on said inwardly disposed portions and means for reciprocating said first named and said second named tuyère members, said hollow end members and said hollow side members being in communication for the passage of cooling fluid.

7. In a cross draft stoker spaced end members, spaced V-side members supported between said spaced end members, downwardly and inwardly disposed V-portions extending from said side members, V-tuyère members mounted for reciprocation between said V-side members and lower V-tuyère members mounted for reciprocation on and between said inwardly disposed V-portions.

8. In a cross draft stoker spaced end members, spaced V-side members supported between said spaced end members with the apices of the V's inwardly disposed, downwardly and inwardly disposed V-portions extending from said side members with the apices of the V's upwardly and inwardly disposed, V-tuyère members mounted for reciprocation between said V-side members having the apices of the V's outwardly disposed and lower V-tuyère members mounted for reciprocation on and between said inwardly disposed V-portions having the apices of the V's downwardly and outwardly disposed.

9. In a cross draft stoker spaced end members, spaced side members supported between said spaced end members, downwardly and inwardly disposed portions extending from said side members, inside members supported between said spaced end members inside said side members and above said downwardly disposed portions, tuyère members mounted for reciprocation between said spaced side members, and lower tuyère members mounted for reciprocation on said downwardly disposed portions whereby a plurality of combustion zones are defined between said side members, said tuyère members, said downwardly disposed portions and said lower tuyère members on the one hand and said inside members on the other.

10. In a cross draft stoker spaced end members, spaced side members supported between said spaced end members, downwardly and inwardly disposed portions extending from said side members, U-shaped members supported between said spaced end members inside said side members and above said downwardly disposed portions and defining an interior chamber, tuyère members mounted for reciprocation between said spaced side members, and lower tuyère members mounted for reciprocation on said downwardly disposed portions whereby a plurality of combustion zones are defined between said side members, said tuyère members, said downwardly disposed portions and said lower tuyère members on the one hand and said U-shaped members on the other.

11. In a cross draft stoker spaced end members, spaced side members supported between said spaced end members, downwardly and inwardly disposed portions extending from said side members, interior members supported between said spaced end members inside said side members and above said downwardly disposed portions defining an interior chamber, tuyères in said interior members opening into said chamber, tuyère members mounted for reciprocation between said spaced side members and lower tuyère members mounted for reciprocation on said downwardly disposed portions whereby a plurality of combustion zones are defined between said side members, said tuyère members, said downwardly disposed portions and said lower tuyère members on the one hand and said interior members on the other in communication with said chamber.

12. In a cross draft stoker spaced end members, spaced side members supported between said spaced end members, downwardly and inwardly disposed portions extending from said side members, interior members supported between said spaced end members inside said side members and above said downwardly disposed portions defining an interior chamber, tuyères in said interior members opening into said chamber, an orifice in one of said end members opening into said chamber, a conduit surrounding said orifice and extending adjacent the other of said end members, tuyère members mounted for reciprocation between said spaced side members and lower tuyère members mounted for reciprocation on said downwardly disposed portions whereby a plurality of combustion zones are defined between said side members, said tuyère members, said downwardly disposed portions and said lower tuyère members on the one hand and said interior members on the other in communication with said chamber.

13. In a cross draft stoker including spaced end members supporting therebetween a plurality of spaced side members having inwardly and downwardly directed lower portions and a plurality of interior members supported by said end members and spaced from said side members and said lower portions and enclosing a central chamber, tuyère members mounted for reciprocation between said spaced side members and on and between said lower portions, inwardly diverging ports in said tuyère members and means in said ports directing entering air first upwardly and then downwardly.

14. In a cross draft stoker including spaced end members supporting therebetween a plurality of spaced side members having inwardly and downwardly directed lower portions and a plurality of interior members supported by said end members and spaced from said side members and said lower portions and enclosing a central chamber, tuyère members mounted for reciprocation between said spaced side members and on and between said lower portions, inwardly diverging ports in said tuyère members, means in said ports directing entering air first upwardly and then downwardly and ports in said interior members opening and converging into said central chamber.

15. In a device of the type described having a boiler and a cross draft stoker including spaced end members supporting therebetween spaced side members having inwardly and downwardly extending lower portions and interior members supported by said end members and spaced from said side members and enclosing a central chamber, tuyère members mounted for reciprocation between said side members and on and between said lower portions, tuyères in said interior members opening into said chamber and means placing said chamber in communication with said boiler.

16. In a device of the type described having a boiler and a cross draft stoker including spaced end members supporting therebetween spaced side members having inwardly and downwardly extending lower portions and interior members supported by said end members and spaced from said side members and enclosing a central chamber, tuyère members mounted for reciprocation between said side members and on and between said lower portions, tuyères in said interior members opening into said chamber, an orifice in one of said end members opening into said chamber, a tubular member surrounding said orifice and extending into said chamber adjacent the other of said end members and a conduit connecting said orifice and said boiler.

17. In a device of the type described having a boiler and a cross draft stoker including spaced end members supporting therebetween spaced side members having inwardly and downwardly extending lower portions and interior members supported by said end members and spaced from said side members and enclosing a central chamber, tuyère members mounted for reciprocation between said side members and on and between said lower portions, tuyères in said interior members opening into said chamber, a conduit placing said chamber in communication with said boiler, and centrifugal means in said conduit for trapping dust and fly ash.

18. In a device of the type described having a boiler and a cross draft stoker including spaced end members supporting therebetween spaced side members having inwardly and downwardly extending lower portions and interior members supported by said end members and spaced from said side members and enclosing a central chamber, tuyère members mounted for reciprocation between said side members and on and between said lower portions, tuyères in said interior members opening into said chamber, a conduit placing said chamber in communication with said boiler, an ash receiving chamber and centrifugal means in said conduit comprising spaced elements on opposite walls of said conduit extending into said conduit and having the spaces therebetween in communication with said ash receiving chamber for trapping dust and fly ash.

19. In a device of the type described having a boiler and a cross draft stoker including spaced end members supporting therebetween spaced side members having inwardly and downwardly extending lower portions and interior members supported by said end members and spaced from said side members and enclosing a central chamber, tuyère members mounted for reciprocation between said side members and on and between said lower portions, tuyères in said interior members opening into said chamber, a conduit placing said chamber in communication with said boiler, and centrifugal means in said conduit comprising spaced elements on opposite walls of said conduit extending into said conduit, an ash receiving chamber, means placing the spaces between said elements in communication with said ash receiving chamber, and means placing said ash receiving chamber in communication with said conduit for trapping dust and fly ash.

20. In a cross draft stoker spaced end members, spaced side members supported between said spaced end members, downwardly and inwardly disposed portions formed on said side members, upper tuyère members mounted for reciprocation between said spaced side members, lower tuyère members mounted for reciprocation on said downwardly and inwardly disposed portions and means on the lower ends of said lower tuyère members for forcing the ash out of the stoker.

21. In a cross draft stoker, spaced end members, spaced side members supported between said spaced end members, tuyère members mounted for reciprocation between said spaced side members and means on the lower ends of said tuyère members for forcing the ash out of the stoker.

22. In a cross draft stoker including spaced end members supporting therebetween a plurality of spaced side portions having inwardly and downwardly directed lower elements and a plurality of interior members supported by said end members and spaced from said side members and said lower portions and enclosing a central chamber, tuyère members mounted for reciprocation between said spaced side members and on and between said lower portions, inwardly diverging ports in said tuyère members, said ports being so constructed and arranged as to prohibit the escape of radiant energy.

23. In a cross draft stoker spaced end members, spaced side members supported between said spaced end members, tuyère members mounted in heat exchanging relation with said end and said side members and means for imparting movement to said tuyère members.

24. In a cross draft stoker spaced end members, ribs and tuyères formed on adjacent inner surfaces of said end members and so constructed and arranged that combustion chambers are formed when said end members are assembled, tuyère members mounted in heat exchanging relation with said end members and means for imparting movement to said tuyère members.

25. In a cross draft stoker spaced end members, spaced arcuate side members supported between said spaced end members, arcuate tuyère members mounted in heat exchanging relation with said end and said side members and means for imparting movement to said tuyère members.

26. In a cross draft stoker including a combustion chamber, movable tuyère members at the air inlet side of said combustion chamber and including vertically disposed and downwardly and inwardly disposed portions, and means exterior of said tuyère members underlying said downwardly and inwardly disposed portions and projecting outwardly beyond said vertically disposed portions whereby solid particles escaping outwardly from said tuyère members will drop thereon by gravity and be conducted into the lower portion of the burning zone of said combustion chamber.

27. In a cross draft stoker including a combustion chamber, movable tuyère members at the air inlet side of said combustion chamber and including vertically disposed and downwardly and inwardly disposed portions, a receptacle underlying both portions of said tuyère members, an intake for said receptacle so constructed and arranged that particles escaping outwardly from the vertically disposed portions of said tuyère members will drop by gravity into said intake and an outlet for said receptacle so constructed and arranged that particles will be discharged through said outlet into the lower portion of the burning zone of said combustion chamber.

28. In a cross draft stoker a combustion chamber, hollow walls enclosing said combustion chamber, inlet tuyères in said walls for admitting air to said combustion chamber, outlet tuyères in said walls for discharging the gaseous products of combustion from said combustion chamber, means for reciprocating said air inlet tuyères and resilient means holding said air inlet tuyères in contact with said walls.

29. In a cross draft stoker, a combustion chamber, inlet tuyères for admitting air to said combustion chamber, outlet tuyères for discharging the gaseous products of combustion from said combustion chamber, means for reciprocating said inlet tuyères and resilient means holding said inlet tuyères in contact with the walls of said combustion chamber, said inlet tuyères comprising upper and lower segments and adjustable means connecting said segments for adjusting the amplitude of the movement of said lower segments within a shorter range than that of said upper segments.

30. In a cross draft stoker, a combustion chamber, inlet tuyères for admitting air to said combustion chamber, outlet tuyères for discharging the gaseous products of combustion from said combustion chamber, and means for reciprocating said inlet tuyères, said inlet tuyères comprising upper and lower segments and adjustable means for imparting to said lower segments a shorter range of movement than to said upper segments.

31. In a cross draft stoker, movable tuyère members for admitting air to support combustion in the stoker, ports in said tuyère members and means in said ports for directing the entering air first upwardly and then downwardly.

32. In a cross draft stoker, movable tuyère members for admitting air to support combustion in the stoker, ports in said tuyère members and upwardly concave upper wall portions in said ports.

WESTON M. FULTON.

CERTIFICATE OF CORRECTION.

Patent No. 2,269,812.  January 13, 1942.

WESTON M. FULTON.

It is hereby certified that error appears in the printed specification of the above numbered patent requiring correction as follows: Page 10, second column, line 71, claim 22, for the word "portions" read --members--; line 72, same claim, for "elements" read --portions--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.